United States Patent [19]
Morishita et al.

[11] 4,123,381
[45] Oct. 31, 1978

[54] PROCESS FOR PRODUCING CELLULOSE MICROCAPSULES, AND RESULTING CELLULOSE MICROCAPSULES

[75] Inventors: Masataka Morishita; Mitsuru Fukushima; Tutomu Sasagawa; Yoshihito Inaba, all of Shizuoka; Yasuo Yokokawa, Tokyo; Satoshi Araragi; Narumi Yoshida, both of Nobeoka; Hachiro Uchiyama, Moriyama, all of Japan

[73] Assignees: Toyo Jozo Company, Ltd.; Asahi Kasei Kogyo Kabushiki Kaisha, both of Japan

[21] Appl. No.: 766,729

[22] Filed: Feb. 8, 1977

Related U.S. Application Data

[63] Continuation of Ser. No. 560,936, Mar. 21, 1975, abandoned.

[30] Foreign Application Priority Data

Feb. 20, 1975 [JP] Japan .................................. 50-20381

[51] Int. Cl.$^2$ ............................................. B01J 13/02
[52] U.S. Cl. ...................................... 252/316; 424/22; 424/35

[58] Field of Search ..................... 252/316; 424/35, 22

[56] References Cited

U.S. PATENT DOCUMENTS

| | | | |
|---|---|---|---|
| 2,206,975 | 7/1940 | Ripper | 424/35 |
| 2,951,753 | 9/1960 | Groves | 71/1 |
| 3,522,346 | 7/1970 | Chang | 252/316 X |
| 3,561,003 | 2/1971 | Lanham et al. | 106/22 |
| 3,664,963 | 5/1972 | Pasin | 424/35 X |
| 3,725,113 | 4/1973 | Chang | 424/35 X |

*Primary Examiner*—Richard D. Lovering
*Attorney, Agent, or Firm*—Craig & Antonelli

[57] ABSTRACT

A cellulose microcapsule having absorbing capacity, consisting of outer semipermeable barrier layer of cellulose and absorbent powders dispersed within inner cellulose gel matrix is prepared by dispersing adsorbent powders in a solution of cellulose dissolved in a solvent which is not adversely affected by the adsorbing capacity of adsorbent powders and capable of dissolving cellulose, then forming the dispersion into droplets and finally precipitating cellulose on the droplets. It is excellent in resistance to chemicals such as acids, alkalis or organic solvents and is useful for various purposes.

10 Claims, No Drawings

PROCESS FOR PRODUCING CELLULOSE MICROCAPSULES, AND RESULTING CELLULOSE MICROCAPSULES

This is a continuation of application Ser. No. 560,936 filed Mar. 21, 1975, now abandoned.

This invention relates to a process for producing a cellulose microcapsule having adsorbing capacity, which consists of outer semipermeable barrier layer of cellulose and adsorbent powders dispersed within inner cellulose gel matrix, and to a process for producing the same.

Particles which contain adsorbent powders encapsulated within semipermeable polymeric microcapsule wall films, have been produced by conventional microencapsulation techniques such as encapsulating by coagulation in liquid medium, by phase separation or by drying in liquid vehicle. Various polymeric materials have been used to form wall films of such microcapsules. For example, there have been used such cellulose derivatives as cellulose acetate, cellulose propionate, cellulose butyrate, cellulose acetate propionate, cellulose acetate butyrate, etc. Other polymers such as polyacrylonitrile, polyacrylic esters; acrylatemethacrylate copolymers, polyvinyl chloride, polyvinyl butyral, polyvinyl formal, vinyl chloride-vinyl acetate copolymer, etc. have also been used. However, these polymer materials known in the art proved to be not satisfactory in resistance to chemical reagents. Namely, they are disintegrated in acidic or alkaline aqueous solutions or they are dissolved by various organic solvents. For example, if the microcapsules which consist of cellulose acetate or polyacrylonitrile and adsorbent powders are charged in 1 N sodium hydroxide solution under heating, they are disintegrated to release adsorbent powders encapsulated therein. As these particles are frequently subjected to treatment with various chemicals such as acidic or alkaline aqueous solutions or organic solvents, occasionally under heating, at the time of regeneration or elution, they are required to be highly resistant to such chemical reagents.

Quite recently, novel cellulose microcapsules have been proposed to be produced by a process which comprises subjecting cellulose ester derivative microcapsules having adsorbing capacity, consisting of outer semipermeable barrier layer of cellulose and adsorbent powders dispersed within inner gel matrix of cellulose ester derivative to ester hydrolysis, as disclosed by Japanese Patent Application No. 32686/1974. This process is an indirect process for production of cellulose microcapsules. In said process, microcapsule precursors are prepared by, for example, dissolving cellulose ester derivative in a solvent to prepare a cellulose solution, then dispersing adsorbent powders, e.g. activated charcoal in the solution, followed by formation of microcapsules by various methods such as by coagulation in liquid, evaporation in water, evaporation in oil or by phase separation. The microcapsule precursors thus prepared are then subjected to ester hydrolysis to convert gel matrix and outer layer of cellulose ester derivatives to cellulose.

The object of the present invention is to provide a direct process for producing cellulose microcapsules having adsorbing capacity, consisting of outer semipermeable barrier layer of cellulose and adsorbent powders dispersed within inner cellulose gel matrix.

The present invention provides a process for producing cellulose microcapsules having adsorbing capacity, containing adsorbents within cellulose wall films, which comprises dispersing adsorbents in a solution of cellulose dissolved in a solvent which is not adversely affected by the adsorbing capacity of adsorbents and capable of dissolving cellulose, then forming the resulting dispersion into droplets and finally effecting precipitation of cellulose on the droplets.

In practicing the process according to this invention, cellulose is first dissolved in a solvent which is not adversely affected by the adsorbing capacity of adsorbents and capable of dissolving cellulose. It is not necessarily required to use cellulose of high purity. There may be used any shape of material containing cellulosic components such as powders, fragments, fibers, papers or other shapes. Examples are pulp, ground pulp, filter paper, regenerated cellulose and microcrystalline cellulose. Among them, inexpensive pulp, ground pulp and regenerated cellulose may preferably be employed.

As solvents which are not adversely affected by the adsorbing capacity of adsorbent powders and capable of dissolving cellulose, there may be used, for example, xanthate solution, cuprammonium solution, copper ethylenediamine solution, saturated aqueous zinc chloride solution, $NO_2$-polar organic solvent (for example, DMF, DMA and DMSO) solution, and $NH_3$-$SO_2$-polar organic solvent solution or diethylamine-$SO_2$-polar organic solvent solution. Among these solutions, $NO_2$-polar organic solvent solution are unstable in the air, emit sharp offensive smoll of $NH_3$ or amine-$SO_2$ and sharp irritant odor of $NO_2$ and decrease the solubility of cellulose by emission of such gases. Therefore, xanthate solution and cuprammonium solution are preferred in industrial application.

The concentration of the solution to be used is not limited, so long as it can dissolve cellulose. There may be utilized, for example, an aqueous alkaline solution of so called viscose prepared by adding 10 to 50% of carbon disulfide to alkali cellulose; copper tetramine hydroxide (cuprammonium) solution containing 2 to 7% (W/V) of copper, 5 to 15% of ammonia and 5 to 15% of cellulose and solutions having such compositions as $NO_2$:DMF=1500 to 3500:100 to 300, $NO_2$:DMSO=1500 to 3000:100 to 300, diethylamine:-$SO_2$:DMF:(or DMSO)=100 to 150: 120 to 400: 750 to 840: (or 830 to 920) and diethylamine: $SO_2$:DMSO:acetonitrile=150 to 170: 14 to 40: 120 to 130: 35 to 45.

If a large quantity of cellulose is dissolved, the viscosity of the solution becomes too high, and is not suitable for dispersing adsorbents. If the quantity of cellulose dissolved is too small, on the other hand, the shape of droplets obtained from the solution, in which cellulose has been dissolved will easily be disintegrated. Generally, the appropriate concentration of cellulose is about 1.5 to 15% (W/V)(at 20° C., 200 to 2000 cps) and preferably about 1.7 to 13% (at 20° C., 280 to 1800 cps). Furthermore, solutions having the above-mentioned cellulose dissolved in a solvent which is not adversely affected by the adsorption capacity of adsorbents and capable of dissolving cellulose, there may also be used such cellulose solution as cellulose xanthate solution (viscose) or cellulose cuprammonium solution which are obtained in the process for producing viscose rayon or cuprammonium rayon in a suitably diluted concentration.

Subsequently, the adsorbent powders are dispersed in the above solution. As adsorbents, there may be utilized any material having adsorbing capacity, for example, activated charcoal, bone black, silica gel, silica alumina gel, bentonite, zeolite, ion exchange resins selected from the group consisting of weakly anionic, strongly anionic, weakly cationic and strongly cationic ion exchange resins, and metal chelate resins. These adsorbent powders are preferably used after adsorption treatment by the solvent used. As such adsorbent powders, there may generally be used commercially available adsorbent powders which have about 1 to 20 $\mu$ of particle diameter. The amount of the adsorbent powders to be added varies depending on the amount of cellulose and solvents used. In this case, the adsorbent powders may satisfactorily be used in such an amount as to be sufficiently coated with dissolved cellulose. The above amount may also be properly changed according to hardness and adsorption capacity per unit weight of the cellulose microcapsules obtained. It is normally about 90% (W/W) or less, preferably about 40 to 60%, based on cellulose microcapsules obtained.

The thus prepared solution having cellulose dissolved therein to which the adsorbent powders are added, is sufficiently mixed to form a uniform dispersion, which is then formed into droplets, followed by precipitation of cellulose. Formation of the solution into droplets may be performed by a so called orifice method wherein the solution is formed into droplets by using, for example, a tube or turnplate having single or plural orifices of 1 to 10 mm in diameter. Alternatively, it may be performed by a dispersion method wherein the solution is dispersed to the form of droplets in a vehicle such as liquid paraffin, e.g. liquid paraffin of Japanese Pharmacopoeia or halogenated paraffin, or silicone oil, e.g. methyl silicone oil, phenyl silicone oil or methyl phenyl silicone oil which is poorly miscible with the solvent used, does not precipitate cellulose and has a viscosity suitable for forming liquid droplets. The amount of the vehicle to be used in the dispersion method may be about 5 to 30 times the amount of the solution to be dispersed.

Then, these liquid droplets are subjected to precipitation of cellulose. Precipitation of cellulose is effected by decrease or loss of solubility of cellulose in the solvent by dilution or modification of the solvent. Usually, solubility of cellulose in the solvent is made to be lowered or lost very rapidly, thereby precipitating and forming cellulose on surfaces of liquid droplets. Modification of the solvent may be performed, for example, by dropwise addition of droplets in an aqueous solution containing solvent modifying acid compounds such as hydrochloric acid or sulfuric acid, simultaneously causing dilution of the solvent. Alternatively, it may be performed in the dispersion method, by similarly incorporating an aqueous solution of acid compounds in the dispersion of the solution in a vehicle, simultaneously causing dilution of the solvent. Furthermore, in the dispersion method, the dispersion may be subjected to reduced pressure or heating to separate or remove cellulose solubilizing components therefrom. In the orifice method, the above-mentioned materials for dilution or modification of the solvent may be normally used in amounts enough to precipitate cellulose. Generally, they are used in amounts equal to or more than, preferably 10 to 60 times, the amount of the solvent used. When an acid compound is used, it may be used generally as dilute aqueous solution and preferably as about 5 to 15% aqueous solution. On the other hand, in the dispersion method, these materials employed for dilution or modification of the solvent, may be used usually in amounts enough to precipitate cellulose, that is, not less than the amount of the solvent used, generally about equal to or up to about 4 times the amount of the solvent, preferably about equal to or up to about 3 times the amount of the solvent. When an acid compound is employed, there may be used an aqueous solution of the same concentration as mentioned above. If modification of the solvent is effected by means of reduced pressure or heating in the dispersion method, it may usually be conducted under reduced pressure or heating enough to separate or remove volatile components used in the solvent, thereby precipitating cellulose. By such treatment as mentioned above, cellulose wall films are precipitated on surfaces of liquid drops to form the outer barrier layer. Then, the resultant product is recovered according to usual solid-liquid separation procedure and washed, if desired, to obtain cellulose microcapsules containing adsorbent powders.

The cellulose microcapsules of the present invention have an outer diameter from about 100 to 5000 microns and have an outer barrier layer of continuous solid phase cellulose which is 0.5 to 5 microns in thickness and contains micropores of from about 10 to 80 angstroms in diameter, adsorbent powders being dispersed within cellulose gel matrix innerside of said outer barrier layer.

The cellulose microcapsules containing adsorbent powders obtained by this invention have very excellent properties as stated above and may be used for various purposes, for example, treatment of waste liquors such as removal and recovery of organic compounds, which are coloring components, from colored waste liquors in dye industry, caramel industry, beverage industry wherein coloring agents are used and fermentation industry wherein syrup is used; removal or recovery of proteins from waste liquors containing organic compounds such as proteins in food industry for processing fish or meat and pharmaceutical industry; decolorization of alcoholic beverages; and adsorption and recovery of medicines in pharmaceutical industry.

The present invention is illustrated in further detail with the following examples, which are not limiting the scope of the present invention.

EXAMPLE 1

A viscose dope obtained by a known process (composition: cellulose 8.5%, sodium hydroxide 6.5%, carbon disulfide on the basis of cellulose 35%, viscosity 700 cps., at 20° C.) was diluted with 4 N sodium hydroxide solution to adjust the cellulose content to 6.4%. In 240 ml of the thus prepared viscose dope were uniformly dispersed 24 g of activated charcoal (trade name: Kyoryoku Shirasagi, produced by Takeda Chemical Industries, Ltd., Japan). Then, the resulting dispersion was added dropwise from an atomizer cup having 18 orifices of 5 mm in diameter to 10 liters of 3.6 N aqueous hydrochloric acid solution to obtain cellulose microcapsules of 1 to 5 mm in diameter containing activated charcoal a powders.

EXAMPLE 2

A viscose dope was diluted with 4 N sodium hydroxide solution to adjust the cellulose content to 6.4%. To 400 ml of the thus prepared viscose solution were added 250 g of activated charcoal (trade name: Carborafin, produced by Takeda Chemical Industries, Ltd.). Then, the resulting mixture was kneaded to sufficiently disperse activated charcoal. Then, the obtained product was allowed to pass through a granulator (cylindrical granulator produced by Kikusui Seisakusho Co., Japan), thereby preparing granules of 0.5 to 1 mm in diameter which were further treated with another granulator (trade name: Marmellizer, produced by Fuji Denki Kogyo Co., Japan) until the granules became round and wetted slightly on their surfaces to obtain round granules of 0.5 to 3 mm in diameter. Then, the obtained granules were dropped into 20 liters of an aqueous solution containing 11% sulfuric acid and 17% sodium sulfate to produce cellulose microcapsules of 0.5 to 3 mm in diameter containing activated charcoal powders.

EXAMPLE 3

A viscose dope was diluted with 2 N sodium hydroxide solution to adjust the cellulose content to 5.1%. In 200 ml of the thus prepared viscose solution were uniformly dispersed 25 g of activated charcoal (Carborafin). The resulting dispersion was dispersed under propeller stirring to the form of fine droplets into 600 ml of liquid paraffin of Japanese Pharmacopoeia (19 cps, at 25° C.). Stirring was further continued to stabilize the dispered state. Then, 200 ml of 3.6 N aqueous hydrochloric acid solution were added to the dispersion at the rate of 8 ml per minute to form microcapsules of 0.5 to 1.2 mm in diameter containing activated charcoal. Then, the microcapsules were filtered with a filter cloth, sufficiently washed with n-hexane, petroleum ether and acetone in this order, and further washed with water to obtain cellulose microcapsules containing activated charcoal powders.

EXAMPLE 4

To 50 ml of cuprammonium solution obtained by a known process (produced by Asahi Kasei Kogyo Kabushiki Kaisha, Japan; composition: cellulose 10%, ammonia 7.2%, copper 3.6%; viscosity 1800 cps, at 20° C.) were added 100 ml of 23% aqueous ammonia. Then, 10 g of activated charcoal (trade name: Shirasagi New Gold, produced by Takeda Chemical Industries, Ltd., Japan) were uniformly dispersed in the resulting solution mixture. The thus obtained dispersion was dropped from an atomizer cup into 10 liters of warm water at 40° C. to produce cellulose microcapsules of 1 to 5 mm in diameter, containing activated charcoal powders.

EXAMPLE 5

To a mixture of 122.7 g of dimethyl sulfoxide, 40.9 g of acetonitrile, 16.4 g of diethylamine and 14.4 g of $SO_2$ were added 4 g of ground pulp to be dissolved therein. Further, 20 g of $SO_2$ were allowed to pass through the resulting solution to obtain a cellulose solution (concentration of cellulose: 18.3%). In the thus obtained solution were dispersed 4 g of activated charcoal having 2.5 g of $SO_2$ adsorbed on 7 g of activated charcoal. Then, the dispersion was dropped from an injector having 1 mm in diameter into 10 liters of water to produce cellulose microcapsules, containing activated charcoal powders.

EXAMPLE 6

To a mixture of 308.2 g of dimethylformamide and 160.0 g of $NO_2$ were added 6 g. of ground pulp to be dissolved therein, thus obtaining bluish green cellulose solution (concentration 1.81%). Then, 6 g of activated charcoal having adsorbed 2.0 g of $NO_2$ on 7 g of activated charcoal were dispersed in the resulting solution. Then, the thus prepared dispersion was dropped from an injector having 1 mm in diameter into 10 liters of water to produce cellulose microcapsules, containing activated charcoal powders.

EXAMPLE 7

A viscose dope was diluted with 2 N sodium hydroxide solution to adjust the cellulose content to 5.1%. In 200 ml of the resulting viscose solution were uniformly dispersed 20 g of crushed ion exchange resin IRA 401 (produced by Rohm & Haas Co.). Then, the dispersion was dropped from an atomizer having 12 orifices of 5 mm in diameter into 10 liters of 3.6 N aqueous hydrochloric acid solution to obtain cellulose microcapsules, containing IRA 401 resins.

EXAMPLE 8

A viscose dope was diluted with 2 N sodium hydroxide to adjust the cellulose content to 5.1%. In 200 ml of the resulting viscose solution were uniformly dispersed 20 g of bentonite powders (produced by Wako Junyaku Co., Japan). Then, the dispersion was dropped from an atomizer cup having 12 orifices of 5 mm in diameter into 10 liters of 3.6 N aqueous hydrochloric acid solution to obtain cellulose microcapsules, containing bentonite powders.

EXAMPLE 9

The cellulose microcapsules obtained in Examples 1 to 6 (Microcapsules No. 1 to 6) were tested for their acid resistance, alkali resistance, solvent resistance and adsorption capacity.

(1) Measurement of resistance:

Acid resistance: 2 N aqueous sulfuric acid solution, boiled for 5 hours, 1, 5, 10, 15 and 25 days;

Alkali resistance (a): 1 N aqueous sodium hydroxide solution, at 80° C., for 5 hours, 1, 5, 10, 15 and 25 days;

Alkali resistance (b): 1 N aqueous sodium hydroxide solution, at 90° C., for 5 hours, 1, 5, 10, 15, and 25 days;

Solvent resistance (a): 100% acetone, at room temperature, for 1, 5, 10, 15 and 25 days;

Solvent resistance (b): 100% methanol, at room temperature, for 1, 5, 10, 15 and 25 days;

Solvent resistance (c): 100% dimethylsulfoxide, at room temperature, for 1, 5, 10, 15 and 25 days;

Solvent resistance (d): 20% aqueous ethanol solution, at room temperature, for 1, 5, 10, 15 and 25 days.

The result is set forth in Table 1.

(2) Adsorption capacity

Substrate solution (1): 0.01% aqueous Methylene Blue solution (OD 595 m$\mu$:7.28) 100 ml Substrate solution (2): aqueous caramel solution (OD 420 m$\mu$:2.0) 100 ml Measurement of adsorption degree:

Each kind of microcapsules corresponding in quantity to 1 g of the adsorbent content was sampled and immersed in the substrate solution for 24 hours followed by filtration. The OD value was obtained by measuring the filtrate at OD 595 m$\mu$ or OD 420 m$\mu$ and its adsorption degree was calculated according to the following equation;

$$\text{Adsorption degree} = \frac{\text{OD value of substrate solution} - \text{OD value of filtrate}}{\text{OD value of substrate solution}} \times 100\ (\%)$$

For comparison, powdery activated charcoal (trade name: Shirasagi New Gold, produced by Takeda Chemical Industries, Ltd. Japan as Control sample 1; trade name: Carborafin, produced by Takeda Chemical Industries, Ltd., Japan, as Control sample 2) and granular activated charcoal (trade name: Adoster-P 5-L, produced by Ados Chemical Co. as Control sample 3; trade name: Adoster-B 1-L, produced by Ados Chemical Co. as Control sample 4) were also tested in the same manner as described above. Table 2 shows the results obtained.

Table 1

| | Resistance properties | | | | | | | | | | | | | | | | | | | | | | | | |
|---|---|---|---|---|---|---|---|---|---|---|---|---|---|---|---|---|---|---|---|---|---|---|---|---|---|
| | Acid resistance | | | | | | Alkali resistance (a) | | | | | | Alkali resistance (b) | | | | | | Solvent resistance (a) | | | | | | |
| | hrs | | days | | | | hrs | | days | | | | hrs | | days | | | | hrs | | days | | | | | |
| | 5 | 1 | 5 | 10 | 15 | 25 | 5 | 1 | 5 | 10 | 15 | 25 | 5 | 1 | 5 | 10 | 15 | 25 | 1 | 5 | 10 | 15 | 25 | | |
| Microcapsule No. 1 | − | − | − | − | − | − | − | − | − | − | − | − | − | − | − | − | − | − | − | − | − | − | − | | |
| Microcapsule No. 2 | − | − | − | − | − | − | − | − | − | − | − | − | − | − | − | − | − | − | − | − | − | − | − | | |
| Microcapsule No. 3 | − | − | − | − | − | − | − | − | − | − | − | − | − | − | − | − | − | − | − | − | − | − | − | | |
| Microcapsule No. 4 | − | − | − | − | − | − | − | − | − | − | − | − | − | − | − | − | − | − | − | − | − | − | − | | |
| Microcapsule No. 5 | − | − | − | − | − | − | − | − | − | − | − | ± | − | − | − | − | ± | ± | − | − | − | − | − | | |
| Microcapsule No. 6 | − | − | − | − | − | − | − | − | − | ± | ± | + | − | ± | ± | + | + | + | − | − | − | − | − | | |

| | Solvent resistance (b) | | | | | Solvent resistance (c) | | | | | Solvent resistance (d) | | | | |
|---|---|---|---|---|---|---|---|---|---|---|---|---|---|---|---|
| | days | | | | | days | | | | | days | | | | |
| | 1 | 5 | 10 | 15 | 25 | 1 | 5 | 10 | 15 | 25 | 1 | 5 | 10 | 15 | 25 |
| Microcapsules No. 1 | − | − | − | − | − | − | − | − | − | − | − | − | − | − | − |
| Microcapsule No. 2 | − | − | − | − | − | − | − | − | − | − | − | − | − | − | − |
| Microcapsule No. 3 | − | − | − | − | − | − | − | − | − | − | − | − | − | − | − |
| Microcapsule No. 4 | − | − | − | − | − | − | − | − | − | − | − | − | − | − | − |
| Microcapsule No. 5 | − | − | − | − | − | − | − | − | − | − | − | − | − | − | − |
| Microcapsule No. 6 | − | − | − | − | − | − | − | − | − | − | − | − | − | − | − |

Note)
−Entirely unchanged
±Microcapsules were unchanged in shape, but the solution was decolored.
+No change in shape of microcapsules but minute amount of sediment-like substance found in solution Table 2

| Samples | Substrate solution (1) | | Substrate solution (2) | |
|---|---|---|---|---|
| | OD 595 mμ value of filtrate | Absorption degree | OD 420 mμ value of filtrate | adsorption degree |
| Control sample 1 | 0 | 100 | 0.560 | 72 |
| Control sample 2 | 0 | 100 | 0.500 | 75 |
| Microcapsule No. 1 | 0.582 | 92 | 0.540 | 73 |
| Microcapsule No. 2 | 0.436 | 94 | 0.520 | 74 |
| Microcapsule No. 3 | 0.728 | 90 | 0.600 | 70 |
| Microcapsule No. 4 | 0.364 | 95 | 0.640 | 68 |
| Microcapsule No. 5 | 0.655 | 91 | 0.620 | 69 |
| Microcapsule No. 6 | 0.873 | 88 | 0.680 | 66 |
| Control sample 3 | 1.53 | 79 | 0.84 | 58 |
| Control sample 4 | 2.82 | 61 | 1.50 | 25 |

Table 1 clearly shows that cellulose microcapsules of this invention are excellent in acid resistance, alkali resistance and solvent resistance. Furthermore, as is shown in Table 2, the adsorbing capacity of the cellulose microcapsules of this invention is similar to that of powdery activated charcoal and is deteriorated little by the microencapsulation process. Furthermore, the cellulose microcapsules of this invention are superior in adsorbing capacity to commercially available granular activated charcoal used as Control samples 3 and 4.

What we claim is:

1. A process for producing an adsorbing cellulose microcapsule having an outer diameter of from 100 to 5000 microns and consisting of an outer semipermeable barrier layer of continuous solid phase cellulose having a thickness of from 0.5 to 5 microns and containing micropores of about 10 to 80 angstroms in diameter and adsorbent powders dispersed within a cellulose gel matrix innerside said barrier layer, which comprises dispersing said adsorbent powders in a solution of cellulose dissolved in a solvent which is not adversely affected by the adsorbing capacity of the adsorbent powders and which is selected from the group consisting of a cellulose xanthate solution and a cellulose cuprammonium solution, said cellulose xanthate solution being a viscose prepared by adding 10 to 50% (W/V) of carbon disulfide to alkali cellulose and said cellulose cuprammonium solution being a copper tetramine hydroxide solution containing 2 to 7% (W/V) of copper, 5 to 15% (W/V) of ammonia and 5 to 15% (W/V) of cellulose, then forming the resulting dispersion into droplets and finally effecting precipitation of cellulose on the droplets, each of said droplets forming a cellulose microcapsule.

2. A process as claimed in claim 1, wherein the concentration of cellulose in the cellulose solution is from 1.5 to 15% (W/V).

3. A process as claimed in claim 1, wherein the cellulose solution is formed into droplets through orifices of 1 to 10 mm in diameter.

4. A process as claimed in claim 1, wherein the cellulose solution is dispersed to the form of droplets in a vehicle which is not miscible with the solvent used, does not precipitate cellulose and has a viscosity suitable for forming liquid droplets.

5. A process as claimed in claim 4, wherein said vehicle is liquid paraffin, halogenated paraffin or silicon oil and the amount of vehicle is from about 5 to 30 times the amount of solution to be dispersed.

6. A process as claimed in claim 1, wherein the amount of adsorbent powders dispersed within said solution of cellulose is not more than 90% by weight based on the weight of the cellulose.

7. A process as claimed in claim 1, wherein precipitation of cellulose is effected by causing dilution of the solvent in said solution.

8. A process as claimed in claim 1, wherein precipitation is effected by removal of solvent from said solution of cellulose.

9. A process as claimed in claim 1, wherein the solid adsorbent is activated charcoal, bone black, silica gel, silica alumina gel, bentonite, zeolite, ion exchange resin or metal chelate resin.

10. An adsorbing cellulose microcapsule produced by the process of claim 1.

* * * * *